3,833,716
METHOD FOR USING REHEAT GAS IN SULFUR RECOVERY SYSTEMS
John W. Palm, Tulsa, Okla., assignor to Amoco Production Company, Tulsa, Okla.
Filed Aug. 2, 1972, Ser. No. 277,421
Int. Cl. C01b 17/04
U.S. Cl. 423—574                        4 Claims

ABSTRACT OF THE DISCLOSURE

Proper reheat gas temperature is maintained in a sulfur plant operation at a high turn-down ratio by providing parallel flow paths in the boiler and withdrawing portions of the hot products from each of the flow paths and mixing with first condenser effluent to bring the gas to reaction temperature. This maintains the optimum temperature and flow rate of reheat gas at high turn-down ratios.

INTRODUCTION

The present invention relates to the production of free sulfur from acid ($H_2S$-containing) gases. More particularly it is concerned with a procedure for producing free sulfur from such gases wherein the feed rate thereof to the sulfur recovery plant varies over a wide range. Specifically, this invention deals with plant operation at high turn-down ratios, i.e., the ratio of design feed rate to the lowest available feed rate. Wide fluctuations in feed rates are frequently experienced in refineries and depend on whether sweet or sour crude is being run. In some cases, sulfur plant design specifications require a turn-down ratio as high as 11:1, resulting in a decrease in recovery to 90–91%. Turn-down ratios of 3:1 or 4:1 are about the maximum considered feasible in the case of conventional plant design.

BACKGROUND OF THE INVENTION

It is known that free sulfur can be recovered from gases of widely varying hydrogen sulfide content. The problem to which the present invention is directed concerns either straight-through or split-flow plants in which the feed rate of gas to the sulfur recovery unit is subject to wide variation, e.g., from 100 percent down to less than 50 percent of the design feed rate.

With acid gas having, for example, a hydrogen sulfide concentration range of about 45 to 100 mol percent, all of the gas—along with the proper amount of air—is fed to a burner, the combustion products from which exhaust into a furnace and, in turn, are discharged into a suitable waste heat boiler. This is the so-called straight-through operation. The furnace acts as a noncatalytic reactor converting from about 40–60 percent of the hydrogen sulfide in the feed to free sulfur. The product sulfur is generally condensed from the boiler effluent before passing to the first reactor. The sulfur thus removed allows for a lower reactor feed temperature which improves yields without incurring catalyst deactivation by sulfur deposition.

Many sulfur recovery units have used reheat gas extracted from the waste heat boiler to preheat feed gas to the catalytic reactors. This practice, which is referred to as "bypass reheat," involves withdrawing a portion, e.g., 10–20 percent, of the boiler effluent at a temperature of from about 900° to 1200° F. and mixing it with cooled (325°–375° F.) gas from the condenser handling the balance of the boiler effluent, to give a reactor feed having a temperature of the order of 425°–450° F. This is a relatively inexpensive reheating method which is generally satisfactory, at least for the first reactor in a two-reactor plant (and for the first reactor or first two reactors in a three-reactor plant) when an exchanger is used to preheat feed gas to the final reactor. The optimum reheat gas temperature is fixed principally by the following considerations. Higher temperatures reduce the amount of reheat gas required and increase sulfur recovery efficiency since bypassing of elemental sulfur to the catalytic reactor is decreased. On the other hand, higher temperatures require more expensive materials for construction of the reheat gas piping and valve. The optimum design temperature is usually in the range of 900° to 1200° F.

Once the optimum reheat gas temperature and materials of construction have been selected and the equipment has been installed, it is desirable to maintain this temperature substantially constant at all times. In the past this has not been possible because the reheat gas temperature decreases when the plant feed gas rate is below design. When the gas flow rate through the boiler declines, the temperature of the reheat gas is lowered because of more effective cooling in the waste heat boiler. For example, when the design temperature is 1200° F., the temperature is about 900° F. at 40 percent of design feed rate. In addition, the temperature of the condenser effluent gas to be reheated declines. It can be seen that with this type of reheating procedure if the feed rate is materially decreased a greater proportion of the boiler effluent must be used for preheating purposes in order for the reactant gases to be raised to the proper temperature level prior to entering the reactor. The boiler effluent used as reheat gas contains free sulfur in vapor form. The presence of a substantial concentration of sulfur in this reheat gas interferes with reaching favorable equilibrium conditions in the reactor, and accordingly, results in a loss in yield as the proportion of reheat gas is increased. As the plant feed rate declines below 40 percent, the reheat gas temperature continues to decrease and the point is eventually reached where it is impossible to even maintain the desired reactor inlet temperature. Finally, for muffle furnace plants when heating the plant up on fuel gas with inert gas to moderate the flame temperature, the inert gas is costly and usually has a limited rate. Thus, it may be impossible to obtain a high enough reheat gas temperature to adequately heat the reactors.

To overcome the above adverse effects my invention provides an improved process which results in a substantially constant temperature of the reheat gas as the plant feed rate declines.

SUMMARY OF THE INVENTION

In accordance with the present invention I am able to operate at high turn-down ratios and still maintain adequate sulfur plant operating conditions. Specifically, the process of my invention contemplates acid gas feed rates down to 10 percent of design and is especially applicable to situations where the acid gas feed rate is not more than about 50 percent of design. After burning the acid gas feed under conditions such that about one-third of the hydrogen sulfide therein is converted to sulfur dioxide, the resulting products of combustion are introduced into the heat exchange section of a boiler where they are forced through separate series of cooling paths, the major portion of the combustion products being ultimately subjected to a condensing step where liquid sulfur is removed from uncondensed reactant gases. When operating at design rate, reheat gas is withdrawn from both paths of the heat exchange section at the selected optimum temperature, typically about 900°–1200° F, and used to preheat the aforesaid uncondensed reactant gases to a temperature at which they will react in the presence of a bauxite or similar catalyst to produce free sulfur. As the gas feed rate to the plant declines and less reheat gas is needed, a smaller amount of hot boiler effluent gas is withdrawn from one path but a constant or slightly greater amount is withdrawn from the other path. In both cases the major portion of the effluent from the first path continues on in series through one or more additional boiler and condenser passes. Thus, as the feed rate to the plant declines the absolute flow rate through the first path declines and the temperature of reheat gas from this path declines, but the absolute flow rate through the second path is increased slightly so its temperature increases slightly. The combined mixture of reheat gas from the two paths thus maintains a substantially constant temperature.

DESCRIPTION OF THE DRAWINGS

My invention will be further illustrated by reference to the accompanying drawings in which:

In FIG. 1, gas discharges from a muffle furnace into conduit 2 and then into first pass tubes 4A and 4B of which there are 68 in waste heat boiler 3. The design effluent temperature from the first pass is 1200° F. where reheat gas is discharged into chambers 6 and 8. Reheat gas can be withdrawn from chambers 6 and 8 by opening valve 11 in line 10 or preferably from chamber 6 by closing valve 11. The design reheat gas rate is about one-tenth of the total first pass effluent. Accordingly, in the example illustrated by FIG. 1, seven tubes are needed to handle the reheat gas at design rate. Chamber 6, for instance, is designed to take the effluent from two tubes. Then when operating at one-third acid gas rate, a reheat gas rate of about 35 to 50 percent of design rate is required. If all of the reheat gas were taken from chamber 6 the reheat gas temperature (gas from path 4B) would be slightly greater than design while the effluent from path 4A (all of which flows on to the second pass tubes 12) would have a temperature considerably lower than design. By opening valve 11 slightly so that most of the reheat gas is taken from path 4B with a minor portion from the path 4A effluent, then the reheat gas temperature is maintained exactly at design value. Process gas also passes through chamber 8 via second pass tubes 12, chamber 14 and condenser 16 via line 18. Sulfur produced in the furnace is condensed and withdrawn as a liquid product through line 20 while uncondensed gases consisting chiefly of hydrogen sulfide, sulfur dioxide, water and nitrogen are taken through line 22 and mixed with reheat gas from line 24.

Figure 1:
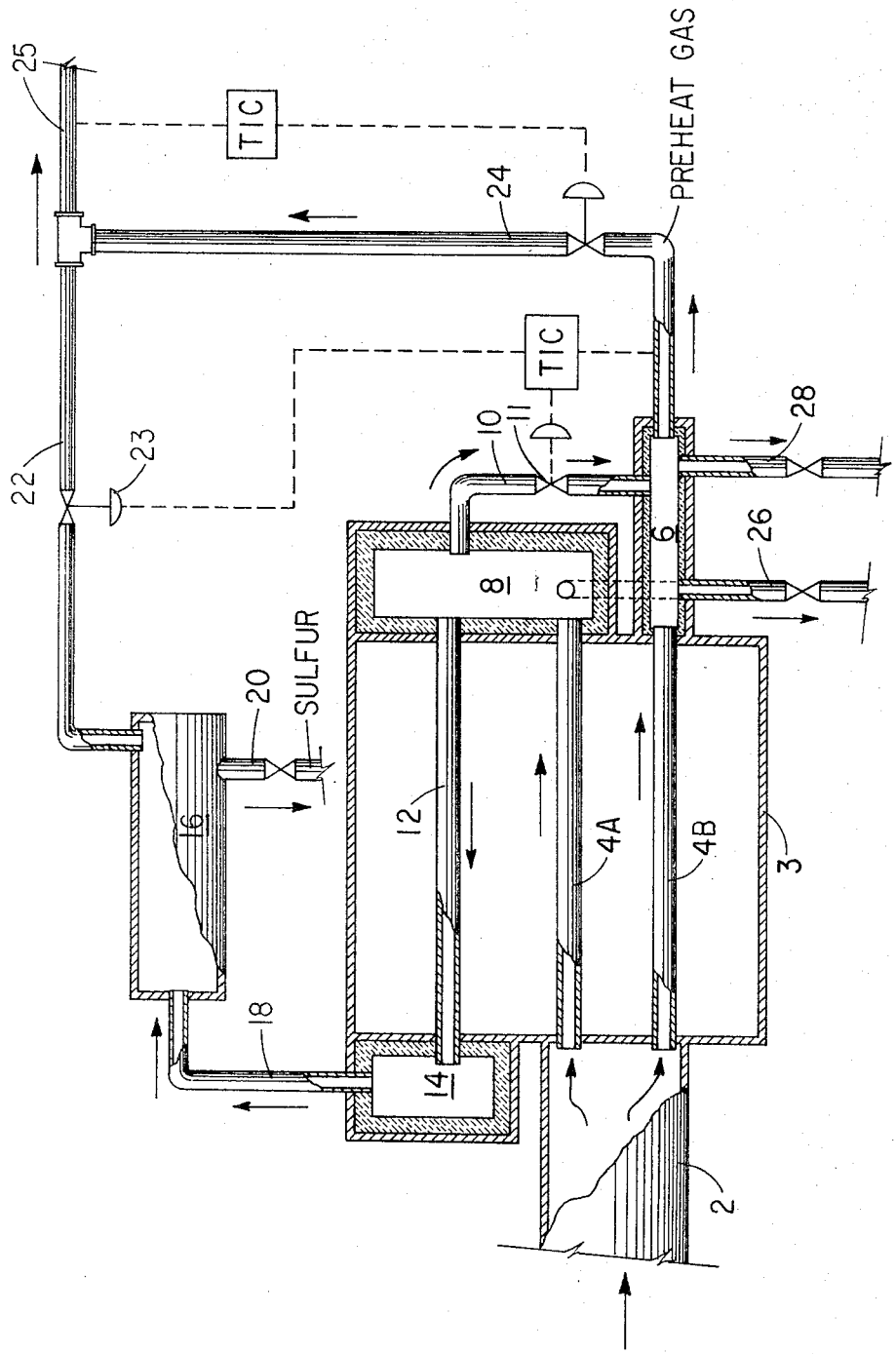
FIG. 1 is an elevational view, partly in section, of a two-pass waste heat boiler and a separate condenser, operating in conjunction with a muffle furnace discharging combustion products into the first pass of the boiler.

In large plants, i.e., at least 50 LT/D, the tubes discharging into chamber 6 will normally be the same size as those discharging into chamber 8. The relative distribution of tubes between paths 4A and 4B is determined by the turn-down to be expected. Thus, for a turn-down of 2:1 the number of tubes in path 4B would be not more than one-half of those required for reheat gas at design rate, while for a turn-down of 5:1 the number of tubes provided in path 4B would be not more than one-fifth of those required for reheat gas at design rate. In small plants, only one tube will be required to conduct hot gas into chamber 6 and it may be smaller in diameter than those that discharge into chamber 8.

Provision should be made for removal of liquid sulfur from chamber 6. Although the gas temperature is above the sulfur dew point, liquid sulfur may be present because the wall temperature of tubes 4B is usually below the sulfur dew point. Accordingly, the arrangement is shown in which a drain line 26 (preferably steam jacketed) from chamber 8 parallels a similar line 28 from chamber 6 and transfers liquid sulfur to a seal pot.

The system described above has no unusual problems in materials of construction. Chambers 6 and 8 are refractory lined. In the past it has been necessary to have a design reheat gas temperature of 1100°–1200° F. in order to maintain a minimum temperature of 900° F. on turn-down. With this modified arrangement it is feasible to design for about 900°–1000° F. and still maintain 900° F. at turn-down. Therefore, it is practical to select piping and valves which are adequate for 1000° F. instead of designing for the higher temperature of 1200° F. Piping materials which are often used include stainless steel and refractory lined carbon steel, with the choice depending on such factors as plant size and the maximum design reheat gas temperature.

In some cases (as pointed out above) the gas discharging from the tubes in chamber 6 will have a temperature higher than normal design. For example—with a design reheat gas temperature of 1000° F.—at low rate, the gas discharging from tubes 4A into chamber 8 may have a temperature of 700°–800° F. and the gas discharging from tubes 4B to chamber 6 may have a temperature of 1000°–1100° F., with the temperature in line 24 being substantially the design value of 1000° F. The operator will be unable to control these temperatures (except in line 24) but the designer can calculate what such temperatures will be at given flow rates.

Valves 11 and 23 can be opened or closed to control the temperature of the reheat gas in line 24. Both valves can be operated from a common temperature control system. Partially closing these valves forces a larger proportion of the reheat gas to flow through tubes 4B and increases the discharge temperature from tubes 4B. However, other control methods will be evident to those skilled in the art. For example, valve 11 can be operated to control the temperature in line 24, as shown, while valves 23 and 24 are operated by another control instrument which controls the temperature in line 25.

Figure 2:
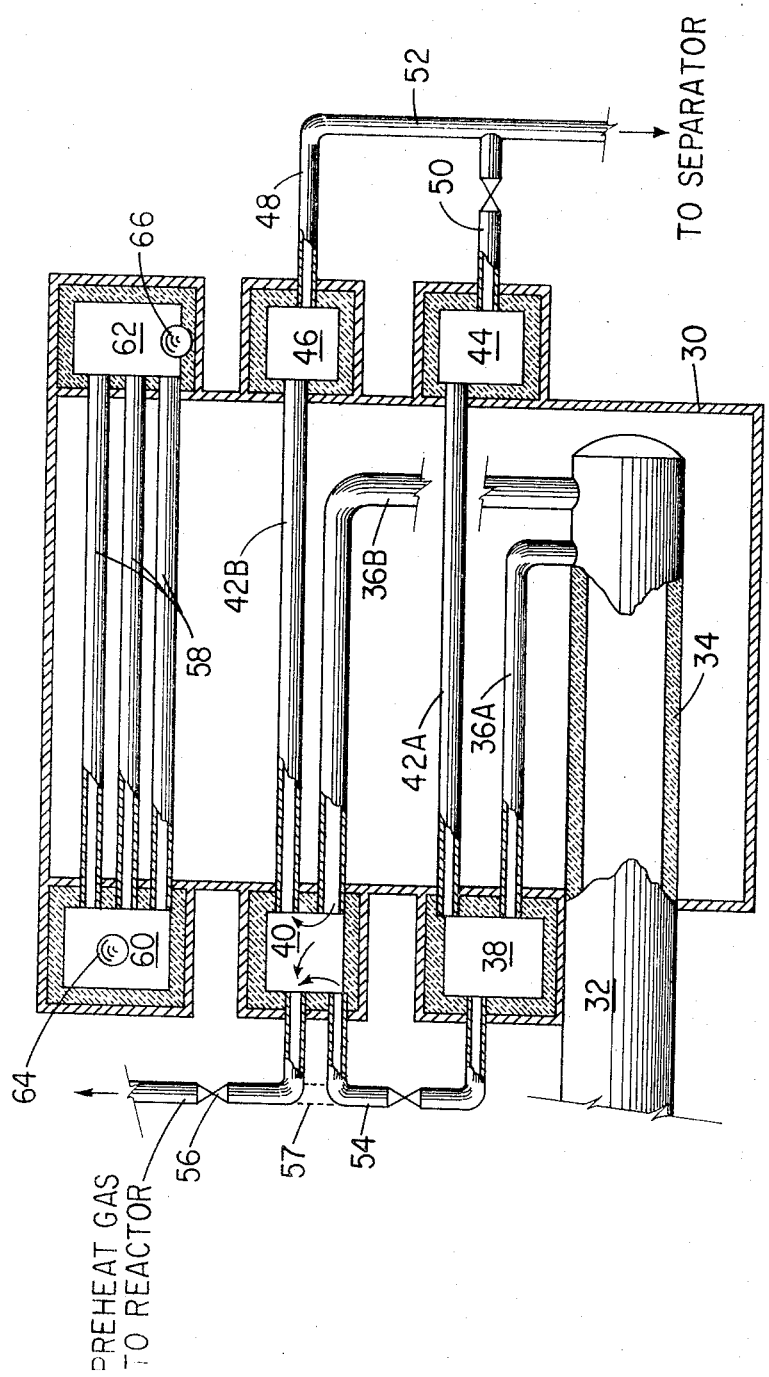
FIG. 2 is likewise an elevational view, partly in section, adapted to a package plant design such as that described and claimed in Webb U.S. 2,939,769.

The process of my invention can also be employed in package plants, the boiler-condenser combination for which is shown in FIG. 2. The latter comprises a cylindrical shell 30 equipped with fire tube 32 into which acid gas and air flow through ports not shown. Surrounding the major portion of the interior of fire tube 32 is a castable refractory material 34. Combustion of about one-third of the acid gas to sulfur dioxide occurs in the fire tube and the resulting products of combustion are withdrawn via first pass tubes 36A and 36B. Part of the first pass tubes lead into chamber 38 and the remainder discharge into chamber 40. Second pass tubes 42A and 42B carry a hot gas from chamber 38 to chamber 44 and from chamber 40 to chamber 46, respectively. Flow lines 48 and 50 take liquid sulfur and unconverted reactants from chamber 46 and 44, respectively, and the combined fluids sent to a separator (not shown) via line 52. At design acid gas rate the valves in lines 50 and 54 are wide open so that the flow rate per tube is substantially the same through path 36A as in path 36B. When the acid gas feed rate declines the flow rate through both paths would tend to decline with a resulting decrease in the temperatures in chambers 38 and 40, from which the reheat gas is extracted. However, the temperature decline in compartment 40 is prevented or reversed by closing the valves in lines 50 and 54 as much as required, so that the mass flow rate per tube through path 36B is at least as great as when operating at design acid gas feed rate. Alternatively, instead of line 54 discharging into compartment 40, it may be connected directly to line 56 as shown by dashed line 57.

Some of the tubes in section 42A would be below the tubes in tubes 36A to provide drainage of liquid sulfur from compartment 38 to compartment 44. Likewise, one or more tubes 42B are positioned to insure drainage of liquid sulfur from compartment 40 to compartment 46.

Superimposed on the first and second pass tubes is a condensing section—comparable to that described in U.S. 2,939,769—composed chiefly of tubes 58 communicating with chambers 60 and 62. Opening 64 receives product gases from the catalytic reactors, not shown, condensing the sulfur therein into liquid form in tubes 58. The sulfur and uncondensed gases are removed through port 66 and taken to a suitable separator. For example, a boiler-condenser as illustrated in FIG. 2 is designed to produce sulfur at a rate of 28 LT/D. If required to operate at 20 percent of design, a castable refractory lining for fire tube 32 is necessary. Without the refractory the gas would be cooled to 1000° F. in only 9.4 feet of the fire tube's length. With the refractory in the fire tube the effluent temperatures at various acid gas feed rates can be calculated by the usual design procedure. Design calculations also show that ten first pass tubes (36A plus 36B) are required with a legnth of 18 feet.

The modification shown in FIG. 2 has a set of second pass tubes 42A between chambers 38 and 44. In a typical high turn-down design this group of tubes constitutes nine-tenths of the total number of second pass tubes. When operating at design flow with valves in lines 50 and 54 open, the velocity is about the same through all first pass tubes and is likewise about the same through all second pass tubes. Thus about 90 percent of the reheat gas comes from chamber 38 and the remainder from chamber 40.

The table below shows typical examples of flow rates and temperatures for the various streams in FIG. 2 at design acid gas feed rate and also at 17 percent of design.

TABLE I

|  | Feed gas rate, percent of design | | | |
|---|---|---|---|---|
|  | 100 | | 17 | |
|  | Rate, mols | Temp., °F. | Rate, mols | Temp., °F. |
| Stream: | | | | |
| Reheat gas from compartment 38 | 5.4 | 1,200 | 0.27 | 310 |
| Reheat gas from compartment 40 | 0.6 | 1,200 | 5.40 | 935 |
| Total | 6.0 | | 5.67 | |
| Cold gas from compartment 44 | 84.6 | 375 | 4.23 | 300 |
| Cold gas from compartment 46 | 9.4 | 375 | 7.10 | 300 |
| Total | 94.0 | | 11.33 | |
| Total reheat gas plus cold gas | 100 | 425 | 17 | 502 |

The above table shows that at design rate the total relative flow through pipe 36B (FIG. 2) is 10 mols compared to 90 mols through path 36A. At a feed gas rate of 17 percent of design, the relative flow rates are 12.5 mols through path 36B and 4.5 mols through path 36A. By increasing the flow rate through path 36B even though the acid gas feed rate declined, the temperature of the reheat gas was held at an acceptable value. The designer should provide a valve in line 48 if pressure drop calculations show that one would be required.

Additional benefits in the process of my invention over conventional reheat procedures are demonstrated in the table below showing the effect of the type of reheat system and sulfur recovery at low feed rates for muffle furnace plants.

TABLE II

| Type of design | Type 1[1] | | | Type 2[1] | | |
|---|---|---|---|---|---|---|
| Feed gas rate, percent of design | 100 | 34 | 34 | 100 | 34 | 34 |
| Type of reheat gas system[2] |  | C | M |  | C | M |
| Reheat gas temp., °F. | 1,200 | 850 | 1,200 | 1,200 | 850 | 1,200 |
| Condenser effluent temp., °F. | 375 | 325 | 325 | 375 | 325 | 325 |
| Incremental sulfur loss, percent: | | | | | | |
| Caused by low reheat gas temp | 0 | 1.4 | 0 | 0 | 0.17 | 0 |
| Caused by low condenser effluent temp | 0 | 0.5 | 0.1 | 0 | 0.10 | 0.03 |
| Total | 0 | 1.9 | 0.1 | 0 | 0.27 | 0.03 |

[1] Type 1 represents a conventional two-reactor, straight-through process with both reactors preheated using reheat gas. Type 2 is a two-reactor, straight-through process, reheat gas to first reactor, exchanger reheat to second reactor.
[2] C indicates conventional system. M indicates modified system of this invention.

From an inspection of the data in Table II it is evident that at high turn-down, i.e., 34 percent of design, plants employing conventional reheat procedures sustained a substantial decrease in reheat gas temperature resulting in sulfur losses up to about 1½ percent whereas at the same turn-down conditions, plants using the reheat method described and claimed herein suffered no reduction in reheat gas temperature from the design level and as a consequence experienced no sulfur loss attributed directly to the reheat gas temperature level. Also, it will be noted that with the reheat method of my invention, sulfur losses resulting from low condenser effluent temperatures at high turn-down were less than in the case of conventional reheat methods.

My invention is also applicable to the split flow process which is generally used for acid gases having a hydrogen sulfide content less than about 45 percent. In this process one-third of the acid gas feed is burned in the furnace along with enough air to oxidize all of the hydrogen sulfide to sulfur dioxide and water. The furnace effluent is partially cooled and then mixed with the other two-thirds of the acid gas to form the feed to the first catalytic reactor. Therefore, in principle, reheat gas is used to control the first reactor feed gas temperature. Reheat gas may also be used to preheat feed gas to succeeding catalytic reactors. Turn-down problems for these units are analogous to those for straight-through operation in that the temperature of the hot boiler effluent declines and may not be sufficient to furnish the desired preheating. This problem is overcome economically by the process of my invention.

I claim:

1. In a process for the recovery of free sulfur from a stream of gas containing hydrogen sulfide wherein the latter is burned in a noncatalytic combustion zone under conditions such that about one-third of the hydrogen sulfide is converted into sulfur dioxide and wherein the feed rate of the hydrogen sulfide to said combustion zone varies from the design rate down to 15 to 20 percent of design, conducting the resulting mixture (1) containing hydrogen sulfide, sulfur dioxide and free sulfur through a heat exchange zone, withdrawing the major portion of said mixture from said zone and cooling it to separate liquid sulfur therefrom, bringing the cooled uncondensed gases from the last-mentioned step to reaction temperature by means of bypass reheating, thereafter conducting the resulting mixture (2) of reactant gases now at reaction temperature into a catalytic reaction zone to promote the reaction of hydrogen sulfide with sulfur dioxide to produce free sulfur, and recovering the latter by means of condensation from the product mixture thus formed, the improvement which comprises:

(1) introducing resulting mixture (1) through flow paths A and B in said heat exchange zone in a manner such that a major amount of resulting mixture (1) flows through path A;

(2) withdrawing mixture (1) from path A and subjecting it to a condensing step at which point liquid sulfur and an uncondensed stream containing hydrogen sulfide and sulfur dioxide are obtained;

(3) varying the amount of mixture (1) flowing through path A with the flow rate of said stream of gas to said combustion zone but maintaining the flow rate through path B substantially constant so that the effluent temperature thereof remains substantially constant; and (4) thereafter preheating said uncondensed stream to catalytic reaction temperature by incorporating therein the hot portion of mixture (1) flowing through and withdrawn from path B to form mixture (2).

2. The method of Claim 1 wherein the rate at which said stream of gas containing hydrogen sulfide fed to said combustion zone is in excess of about 10 percent of design and effluent is taken from path A and mixed with effluent from path B in an amount sufficient when incorporated in said uncondensed stream to produce mixture (2) at catalytic reaction temperature.

3. The method of Claim 1 wherein the flow rate through path B at a given feed rate to said combustion zone is controlled by regulating the flow of mixture (1) through path A.

4. The method of Claim 2 wherein flow rate of mixture (1) through path A is controlled by regulating the flow of said uncondensed stream and the flow rate of effluent from path A.

References Cited

UNITED STATES PATENTS

| 3,297,409 | 1/1967 | Kunkel et al. | 423—574 |
| 3,552,927 | 1/1971 | Franklin et al. | 423—574 X |
| 3,592,602 | 7/1971 | Palm | 423—574 |

GEORGE O. PETERS, Primary Examiner

U.S. Cl. X.R.

23—262